United States Patent [19]

Shochi et al.

[11] Patent Number: 4,748,570
[45] Date of Patent: May 31, 1988

[54] CLAMPING CONFIRMING DEVICE

[75] Inventors: Toshiyuki Shochi; Kenei Nakajima; Nobuaki Joboji, all of Toyama, Japan

[73] Assignee: Kabushiki Kaisha Nippei Toyama, Tokyo, Japan

[21] Appl. No.: 852,690

[22] Filed: Apr. 15, 1986

[30] Foreign Application Priority Data

Apr. 16, 1985 [JP] Japan ................................. 60-81894

[51] Int. Cl.⁴ ........................................... G06F 15/46
[52] U.S. Cl. ..................................... 364/474; 364/513; 91/403; 91/528; 91/527; 901/31; 901/8
[58] Field of Search ................... 364/474, 513; 91/361, 91/403; 901/31, 39, 8, 9

[56] References Cited

U.S. PATENT DOCUMENTS

| | | | |
|---|---|---|---|
| 3,414,136 | 12/1968 | Moore et al. | 91/361 |
| 3,967,242 | 6/1976 | Jsoo et al. | 901/9 X |
| 4,273,505 | 6/1981 | Clark et al. | 901/31 X |
| 4,484,443 | 11/1984 | Takigawa et al. | 91/39 X |
| 4,530,636 | 7/1985 | Inaba et al. | 901/31 X |
| 4,537,547 | 8/1985 | Cole | 91/410 X |
| 4,587,618 | 5/1986 | Oguchi | 364/474 X |
| 4,600,985 | 7/1986 | Nozawa et al. | 364/474 X |
| 4,610,597 | 9/1986 | Wright | 901/31 X |
| 4,628,499 | 12/1986 | Hammett | 364/510 X |
| 4,646,225 | 2/1987 | Matsuura | 364/474 X |

Primary Examiner—Jerry Smith
Assistant Examiner—Steve L. Hoang
Attorney, Agent, or Firm—Sughrue, Mion, Zinn, Macpeak & Seas

[57] ABSTRACT

Apparatus for confirming the clamping conditions of a clamping device which is used to clamp workpieces of different sizes. Signals corresponding to the kind of workpiece being clamped are derived from the flow rate of pressurized fluid used to drive the actuator of the clamping device. These signals are used to confirm the clamping conditions and also the kind, and the presence or absence, of the workpiece.

5 Claims, 3 Drawing Sheets

CLAMPING CONFIRMING DEVICE

BACKGROUND OF THE INVENTION

1. Field of the Invention

This invention relates to a clamping device in which the clamping actuator is operated with pressurized fluid to clamp a workpiece, and more particularly to an electrical device for detecting the clamping conditions of the workpiece from the flow rate of pressurized fluid.

2. Description of the Prior Art

A clamping device of this type is provided at each machining station in a transfer machine to hold a workpiece in place for a machining operation, automatic assembling operation, etc. For this purpose, in general, actuators, such as hydraulic cylinders, are employed.

At the machining station, the machining operation is started after it is confirmed that the workpiece is satisfactorily clamped. Heretofore, the clamping of the workpiece is detected with a dog connected to the piston rod of the hydraulic cylinder and a limit switch provided at the clamping position. However, in the case where it is required to handle workpieces different in size from the previous ones, the mounting position of the limit switch must be changed, and changing the setup accordingly takes a relatively long period of time.

The clamping of the workpiece can be indirectly confirmed by measuring the flow rate of the pressurized fluid. For instance Japanese Patent application Publication No. 35182/1973 has disclosed the technical concept that the length of a multi-stage expansion boom can be represented by the flow rate of the fluid. However, the conventional method merely indicates the length of a multi-stage expansion boom, and cannot be applied to a clamping device as it is. That is, in a clamping device, it is necessary to confirm or detect the kind of a workpiece from the stroke of the actuator, and to confirm the clamping and unclamping of the workpiece to perform the following operations successively.

SUMMARY OF THE INVENTION

Accordingly, an object of this invention is to provide a clamping confirming device for a clamping device in which signals corresponding to the kind of a workpiece are obtained according to the flow rate of pressurized fluid used to drive the actuator of the clamping device, and the signals thus obtained are utilized to confirm the clamping conditions, and also the kind, and the presence or absence, of the workpiece.

In a clamping confirming device according to the invention, a flow detector is provided in a presurized-fluid supplying path, an arithmetic section receives a detection pulse signal from the flow detector indirectly to measure the stroke of a clamping actuator, and the results of the measurement are utilized to confirm the external dimensions of the workpiece: i.e., the kind of workpiece. The output signal of the arithmetic section is supplied to an external sequencer, where the signal, and a pressure signal provided by a pressure switch are ANDed, thereby to confirm the clamping condition from the pressure of the pressurized fluid. After the confirmation of the clamping condition, the external sequencer performs sequential operations for an external system, such as a machining device or transfer device.

As is apparent from the above description, the clamping confirming device of the invention utilizes an electrical signal processing technique to confirm the clamping condition of a workpiece and to determine the kind of workpiece. Therefore, the device an be readily adjusted to handle workpieces different in size, thus being applicable to a so-called "flexible manufacturing system" (FMS).

DETAILED DESCRIPTION OF THE PREFERRED EMBODIMENT

Figure 1:
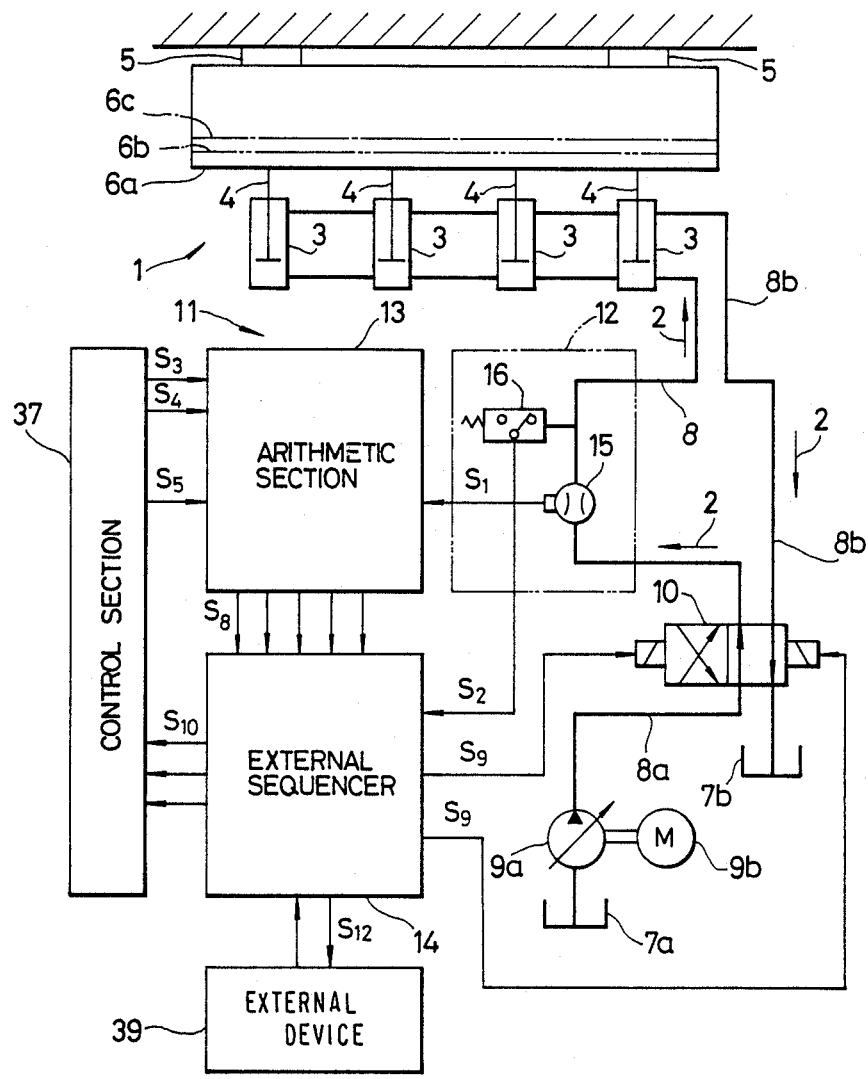
FIG. 1 is a block diagram showing piping systems and electrical systems of a clamping device and a clamping confirming system according to this invention.

A preferred embodiment of the invention will be described in detail with reference to the accompanying drawing.

This invention has been developed for a fluid-driven clamping device 1.

The clamping device 1 comprises, for instance, a plurality of hydraulic cylinders 3 employed as clamping actuator means. The hydraulic cylinders 3 are operated through pressurized fluid 2, to tightly hold a variety of workpieces 6a, 6b and 6c between piston rods 4 and a reference piece 5 provided at the machining station.

The fluid 2 is stored in a tank 7a, and is supplied to the hydraulic cylinders 3 through a supply pipe path 8a, a pressurized fluid source, namely, a pump 9a driven by a motor 9b, and an electromagnetic change-over valve 10. The fluid 2 thus supplied is returned to a tank 7b through a return pipe path 8b and the change-over valve 10.

A clamping confirming device 11 according to the invention comprises: a sensor section 12; an arithmetic section 13; an external sequencer 14; and a control section 37.

The sensor section 12 is provided in the pipe path 8a, and consists of a rotary flow detector 15 and a pressure switch 16. The flow detector 15 operates to convert the flow rate of the pressurized fluid 2, for instance, into the speed (rpm) of a turbine, and to output a detection pulse $S_1$ proportional to the speed. The detection pulse $S_1$ is applied to the arithmetic section 13. The presure switch 16 detects the pressure which is required positively to clamp a workpiece to provide an electrical pressure signal $S_2$. The electrical pressure signal $S_2$ is applied to the external sequencer 14. The external sequencer 14 operates to apply an instruction signal $S_{12}$ to an external device 39, such as a machining device or a transfer device, according to the following program. The control section 37, receiving an instruction signal $S_{10}$, applies a gate change-over signal $S_3$, a clear signal $S_4$ and a shift direction change-over signal $S_5$ to the arithmetic section 13.

Figure 2:
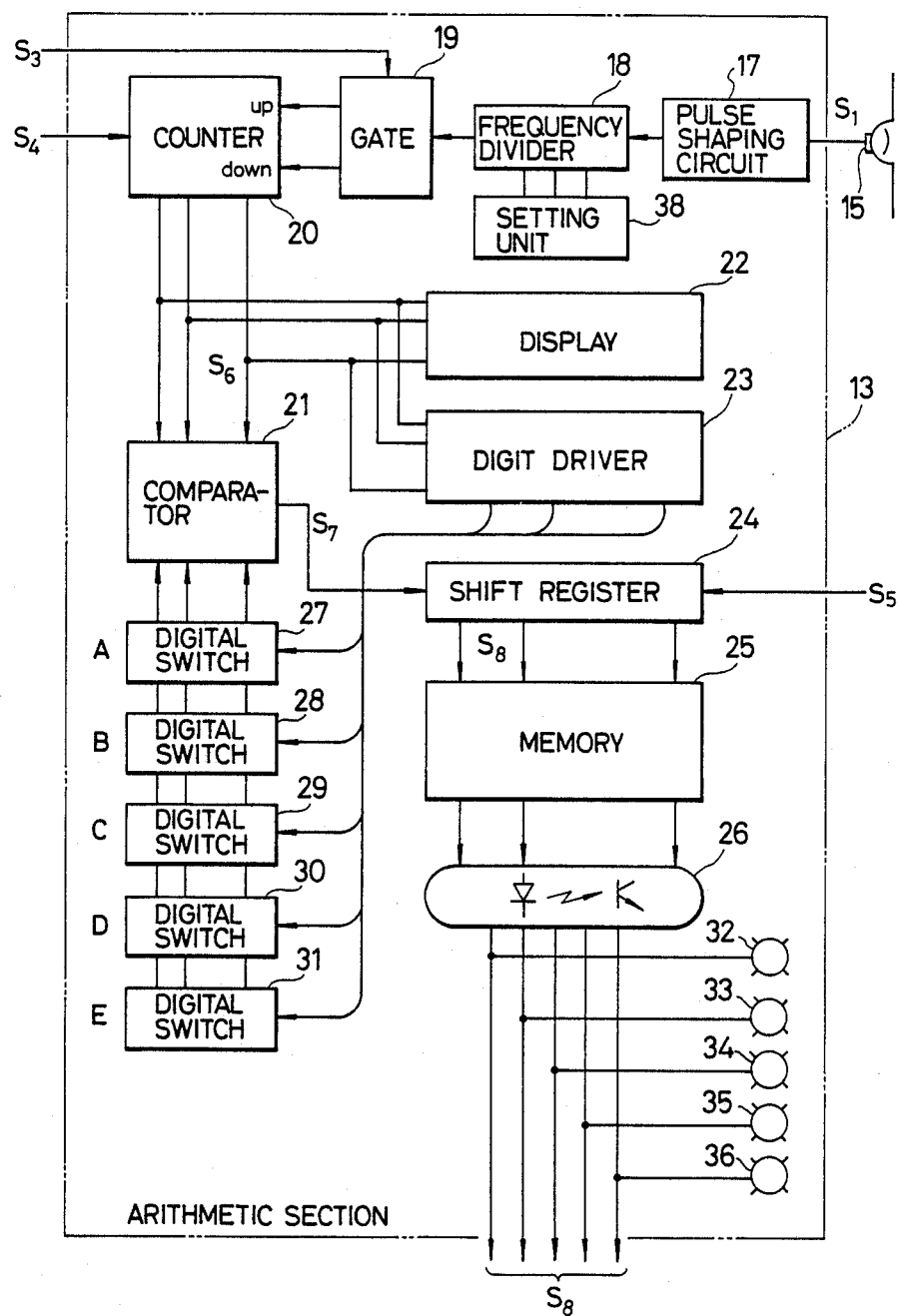
FIG. 2 is a block diagram showing an arithmetic section in FIG. 1.

In the arithmetic section 13, as shown in FIG. 2, a pulse shaping circuit 17, a frequency divider 18, a gate 19 and an up-down counter 20 are connected to the flow detector 15 in the stated order, the up-down counter 20 is connected to a comparator 21, a display unit 22 and a digit driver 23, the output terminal of the comparator 21 is connected through a shift register 24, a memory 25 and, for instance, a photo-coupler type isolator 26 to the external sequencer 14, and the isolator 26 is connected to display lamps 32, 33, 34, 35 and 36.

The frequency divider 18 operates to frequency-divide the detection pulse $S_1$ at a predetermined frequency division ratio according to a value which is set by a setting unit 38. In the comparator 21, a count signal $S_6$ of the counter 20, i.e. its count value, is compared with values A, B, C, D and E set by digital switches 27, 28, 29, 30 and 31 which are driven by the digit driver 23, and whenever the count value coincides with any one of the set values, a coincidence signal $S_7$ is outputted. The signal $S_7$ is applied to the shift register 24 for shifting. The set values A, B and C provided by the digital switches 27, 28 and 29 are for the workpieces 6a, 6b and 6c, respectively. The set values D and E provided by the digital switches 30 and 31 are for over-clamping and unclamping, respectively.

The control section 37 applies the gate change-over signal $S_3$, the clear signal $S_4$ and the shift direction change-over signal $S_5$ respectively to the gate 19, the counter 20, and the shift register 24.

Figure 3:
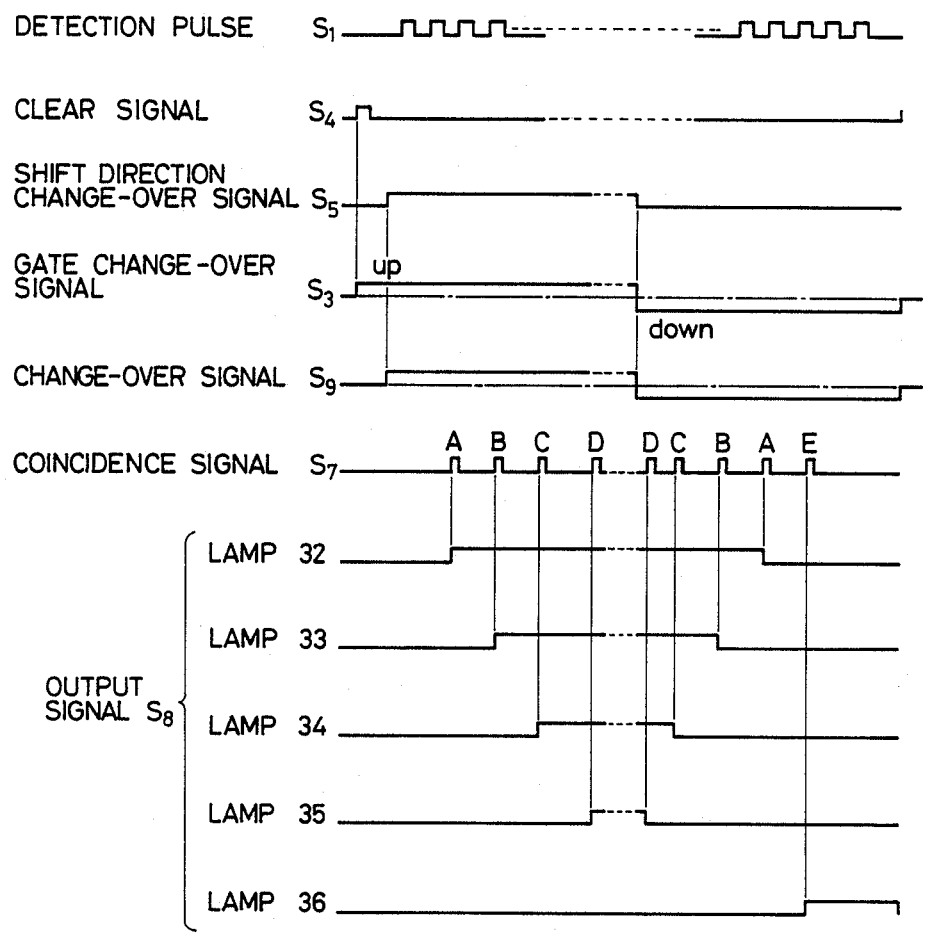
FIG. 3 is a timing chart illustrating the operation of the clamping confirming device.

The operation of the clamping device 1 and the operation of the clamping confirming device 11 will be described with reference to FIG. 3.

Before a clamping operation, the external sequencer 14 operates the control section 37, so that the clear signal $S_4$ is applied to the counter 20 to reset the latter, and the gate change-over signal $S_3$ is applied to the gate 19 to deliver the detection pulse $S_1$ to the "up" input terminal of the counter 20. On the other hand, the hydraulic cylinders 3 are held ready to receive the workpieces 6a, 6b and 6c with the piston rods 4 retracted.

When, under this condition, for instance the workpiece 6c is delivered to the station, the external sequencer 14 detects the delivery of the workpiece 6c with a conventional means, such as a photo-electric sensor, to apply the change-over signal $S_9$ to the change-over valve 10 so that the pressurized fluid 2 is supplied into the first chambers of the hydraulic cylinders 3. As a result, the piston rods 4 of the hydraulic cylinders 3 are moved outwardly according to the amount of fluid thus supplied, thus cooperating with the reference piece 5 to hold the workpiece 6c therebetween. In this clamping operation, the fluid 2 in the second chambers of the hydraulic cylinders 3 is returned through the pipe path 8b into the tank 7b.

On the other hand, the rotary flow detector 15 of the sensor section 12 provides the detection pulse $S_1$ which is proportional to the amount of fluid 2 supplied to the cylinders. The detection pulse $S_1$ is applied to the pulse shaping circuit 17 in the arithemtic section 13. The detection pulse $S_1$ is shaped by the pulse shaping circuit 17, and then frequency-divided at a predetermined frequency division ratio 1/n by the frequency divider 18. The output signal of the frequency divider 18 is applied to the gate 19.

The counter 20 counts the detection pulse $S_1$ thus processed. The count value is applied, as a count signal $S_6$, to the comparator 21, the display unit 22 and the digit driver 23. The display unit 22 is used to externally read the count value of the counter 20. The count value corresponds to the stroke of the hydraulic cylinders 3, and is displayed in such a manner that it can be directly read. On the other hand, the digit driver 23 supplies the outputs of the digital switches 27, 28, 29, 30 and 31 to one input terminal of the comparator 21 according to the count value.

In the comparator 21, the count value of the counter 20 is compared with the set values A, B, C, D and E, and whenever it coincides with any one of the set values, a one-pulse coincidence signal $S_7$ is produced. The coincidence signal $S_7$ is supplied to the shift register 24. The shift register 24 provides its output signal $S_8$ in such a manner that the content is shifted in one direction during clamping and in the opposite derection during unclamping, by "H" level of the shift direction change-over signal $S_5$. The output signal $S_8$, after being stored in the memory 25 just in case of power service interruption, is supplied through the isolator 26 to the external sequencer 14. On the other hand, the output signal $S_8$ is raised to "H" level in correspondence to the set values A, B and C, and the display lamps 32 through 36 are turned on, so that both accomplishment of the stroke of the hydraulic cylinders 3 and also the kinds of workpieces (6a, 6b and 6c) can be externally confirmed.

In the above-described case, the workpiece 6c is clamped. Therefore, after signals for workpieces 6a and 6b, which are larger than the workpiece 6c, have and 6b, which are larger than the workpiece 6c, have been outputted, the output signal $S_8$ is provided in response to an "H" level shift pulse for the workpiece 6c. When the piston rods 4 of the hydraulic cylinders 3 are brought into contact with the workpiece 6c, the advance of the piston rods is stopped.

Even under this condition, the pressurized fluid 2 is still being supplied into the hydraulic cylinders 3 by the pump 9a and the motor 9b, and therefore the pressure of the fluid 2 is gradually increased. When the pressure reaches a value corresponding to a predetermined clamping force, the pressure switch 16 detects the pressure and applies the pressure signal $S_2$ to the external sequencer 14.

In the external sequencer 14, the "H" level output signal $S_8$ for the workpiece 6c and the pressure signal $S_2$ from the pressure switch 16 and ANDed to confirm the correct clamping condition of the workpiece 6c to provide a confirmation signal. And the external sequencer 14 applies an appropriate instruction signal $S_{12}$ to the external device 39.

If the piston rods of the hydraulic cylinders 3 are advanced more than required for some reason, an "H" level output signal $S_8$ is provided in correspondence to the set value D for overclamping, to confirm the absence of the workpiece.

The workpiece 6c thus clamped is machined as required. At the end of the machining operation, the external sequencer 14 applies an instruction signal $S_{10}$ to the control section 37 to change the levels of the gate change-over signal $S_3$ and the shift direction change-over signal $S_5$. As a result, the counter 20 is caused to perform a down-counting operation, and the direction of shift in the shift register 24 is inverted. Thereafter, the change-over valve 10 is operated to supply the pressurized fluid 2 into the second chambers of the hydraulic cylinders 3 to retract the piston rods 4. In this operation, the fluid 2 supplied into the hydraulic cylinders during clamping is returned to the tank 7b through the sensor section 12. Therefore, as opposed to the above-described case, the shift register 24 successively provides the output signals $S_8$ corresponding to the set values D, C, B, A and E. Upon reception of the output signal $S_8$ corresponding to the set value E for unclamping, the external sequencer 14 confirms the unclamping of the workpiece, thus becoming ready for the following control.

When the number of pulses generated per unitary flow rate is varied by changing the flow detector 15 or the workpieces 6a, 6b and 6c, the frequency division ratio (1/n) of the frequency divider 18 should also be changed to a suitable value so as to maintain the sensor section 12 and the arithmetic section 13 operable in all cases.

In the above-described embodiment, the hydraulic cylinders 3 are employed as actuators; however, they may be replaced, for instance, by hydraulic motors. The display unit 22, the memory 25 and the isolator 26 in the arithmetic section 13 may be eliminated as the case may be.

The invention has the following significant effects:

Clamping, unclamping and overclamping positions for workpieces different in size from one another can be preset as desired by switching operations. Furthermore, the accomplishment of clamping of different workpieces can be confirmed without using limit switches and dogs on the actuators, and the confirming means can be installed at a place suitable for adjustment.

As the arithmetic section provides output signals separately according to the outputs of the actuators, the kinds of workpieces (workpiece clamping dimensions) can be detected from the output signals of the arithmetic section. Therefore, even if workpieces different in size are delivered to the machining station at random, the workpieces can be automatically sorted out, so that the following operation can be started immediately.

As, in the above-described embodiment, the sensor section includes the pressure switch, and the arithmetic section comprises the frequency divider and the up-down counter, and the following effects are provided:

As the frequency divider can set the detected-pulse frequency division ratio to a suitable value, the flow detector can be replaced by another one which is different therefrom in the number of pulses generated per unitary flow rate, when necessary. Furthermore, error due to temperature change or piping deflection can be corrected by adjusting the frequency division ratio. In addition, as the content of the counter is reset every detection, the integration of errors therein is prevented.

As was described above, the set values are provided for the kinds of workpieces, the overclamping position and the unclamping position, respectively. Therefore, the absence of the workpiece and the unclamping state can be electrically confirmed. Receiving these data, the arithmetic section and the external sequencer control the succeeding operations according to the machining program.

We claim:

1. In a clamping device in which a clamping actuator is operated by pressurized fluid supplied from a pressurized fluid source, and a workpiece is clamped or unclamped by operating a change-over valve provided in a pressurized fluid supply pipe path, a clamping confirming device comprising:
   sensor means in said pipe path for generating a detection pulse signal indicative of a flow rate of the pressurized fluid;
   arithmetic means for receiving said detection pulse signal and for providing output signals individually indicative of respective clamping positions of said actuator;
   external sequencer means for confirming clamping conditions in response to said output signals from said arithmetic means and for providing instruction signals; and
   control means for controlling said arithmetic means in response to said instruction signals provided by said external sequencer means.

2. A device as claimed in claim 1, wherein said arithmetic means comprises:
   frequency divider means for subjecting said detection pulse signal provided by said sensor means to frequency division at a determined frequency division ratio;
   counter means for counting pulses provided by said frequency divider means separately for a clamping operation and an unclamping operation, respectively;
   comparator means for comparing a count value of said counter to clamping-position-setting set values which have been stored therein, and providing coincidence signals upon coincidence of a count value and one of said set values; and
   shift register means for providing output signals while shifting said output signal according to said coincidence signals.

3. A device as claimed in claim 1, wherein said sensor means comprises pressure switch means for detecting a pressure during clamping.

4. A device as claimed in claim 3, wherein in said external sequencer means an output signal provided by said arithmetic means and a pressure signal provided by said pressure switch means are ANDed to provide a confirmation signal representing the completion of a clamping operation.

5. A device as claimed in claim 4, wherein said control means, in response to said instruction signals from said external sequencer, applies a gate changeover signal, a clear signal, and a shift direction change-over signal to said arithmetic means.

* * * * *